US011356395B1

(12) United States Patent
Deleuze et al.

(10) Patent No.: US 11,356,395 B1
(45) Date of Patent: Jun. 7, 2022

(54) GENERATING A RICH HYPERLINK WITHIN A MESSAGING ENVIRONMENT

(71) Applicant: International Business Machines Corporation, Armonk, NY (US)

(72) Inventors: Ivan Deleuze, Montpellier (FR); Frederic Bonvalet, Castelnau-le-Lez (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/207,151

(22) Filed: Mar. 19, 2021

(51) Int. Cl.
G06F 15/16 (2006.01)
H04L 51/063 (2022.01)
H04L 51/23 (2022.01)
H04L 51/08 (2022.01)
G06F 16/955 (2019.01)

(52) U.S. Cl.
CPC .......... H04L 51/063 (2013.01); G06F 16/955 (2019.01); H04L 51/08 (2013.01); H04L 51/30 (2013.01)

(58) Field of Classification Search
CPC ....... H04L 51/063; H04L 51/08; H04L 51/30; G06F 16/955
USPC .................................................. 709/206, 224
See application file for complete search history.

(56) References Cited

U.S. PATENT DOCUMENTS 9,813,260 B1* 11/2017 Morgan .................. H04L 51/18
2007/0233790 A1* 10/2007 Agarwal .............. G06Q 10/107
709/206
2008/0195599 A1 8/2008 Neils
2011/0145698 A1* 6/2011 Penov .................... G06F 40/221
715/235
2012/0203929 A1* 8/2012 Patalsky ............. G06F 16/9566
709/245
2014/0082494 A1* 3/2014 Harari ..................... H04L 51/08
715/716

(Continued)

FOREIGN PATENT DOCUMENTS

KR 20150076366 A 7/2015

OTHER PUBLICATIONS

Geisler, "Enriched Links: A Framework For Improving Web Navigation Using Pop-Up Views", Interaction Design Laboratory, School of Information and Library Science, University of North Carolina at Chapel Hill, 14 pps., <http://citeseerx.ist.psu.edu/viewdoc/summary?doi=10.1.1.42.6416>.

(Continued)

Primary Examiner — Johnny B Aguiar
(74) Attorney, Agent, or Firm — William H. Hartwell (57) ABSTRACT

Aspects of the present invention disclose a method for generation of a rich link associated with a uniform resource locator (URL) to share information within a messaging system independent of access capabilities of a receiver computing device. The method includes one or more processors identifying a task of multimedia of a video sharing application of a computing device. The method further includes identifying a URL. The method further includes extracting textual data of a web resource corresponding to the URL. The method further includes converting the URL to a rich URL based at least in part on the textual data and a distinct string of characters including the URL. The method further includes transmitting the rich URL to a receiving computing device.

19 Claims, 3 Drawing Sheets

(56) References Cited

U.S. PATENT DOCUMENTS

| | | | |
|---|---|---|---|
| 2015/0154156 A1* | 6/2015 | Meyers, Jr. | G06F 40/106 |
| | | | 715/205 |
| 2015/0156154 A1* | 6/2015 | Russell | H04L 51/22 |
| | | | 709/206 |
| 2015/0220499 A1 | 8/2015 | Katic | |
| 2016/0283447 A1* | 9/2016 | Masterson | G06F 3/0484 |
| 2017/0134326 A1* | 5/2017 | Laporta | H04L 51/22 |

OTHER PUBLICATIONS

Sarkar et al., "A Web Service to Generate Intelligent Previews of Web Links", Conference paper, Jun. 2018, 5 pps., <https://ieeexplore.ieee.org/document/8456370>.

* cited by examiner

GENERATING A RICH HYPERLINK WITHIN A MESSAGING ENVIRONMENT

BACKGROUND OF THE INVENTION

The present invention relates generally to the field of social computing, and more particularly to sharing information within a messaging system.

A Uniform Resource Locator (URL), colloquially termed a web address, is a reference to a web resource that specifies a location of the web resource on a computer network and a mechanism for retrieving the web resource. A URL is a specific type of Uniform Resource Identifier (URI), although many people use the two terms interchangeably URLs occur most commonly to reference web pages (e.g., http), but are also used for file transfer (ftp), email (mailto), database access, and many other applications.

A rich link is a URL provided through an image or video that you display in a chat bubble. Rich links look ahead at the destination of a link and pull back details that can be displayed for the user. These details can include preview text and a teaser image. When a user sends a URL with an inline image or video to a recipient, the recipient receives a "Tap to Load Preview" message, which the recipient then needs to tap to load the content. However, to allow customers to preview content inline without first loading a preview, a user can send a rich link message instead.

In computing, a hyperlink, or simply a link, is a reference to data that a user can follow by clicking or tapping. A hyperlink points to a whole document or to a specific element within a document. Hypertext is text with hyperlinks. The text that is linked from is called anchor text. A software system that is used for viewing and creating hypertext is a hypertext system, and to create a hyperlink is to hyperlink (or simply to link). A user following hyperlinks is said to navigate or browse the hypertext. The document containing a hyperlink is known as its source document.

SUMMARY

Aspects of the present invention disclose a method, computer program product, and system for generation of a rich link associated with a uniform resource locator (URL) to share information within a messaging system independent of access capabilities of a receiver computing device. The method includes one or more processors identifying a task of multimedia of a video sharing application of a computing device. The method further includes identifying a URL. The method further includes extracting textual data of a web resource corresponding to the URL. The method further includes converting the URL to a rich URL based at least in part on the textual data and a distinct string of characters including the URL. The method further includes transmitting the rich URL to a receiving computing device.

DETAILED DESCRIPTION

Embodiments of the present invention allow for generation of a rich link associated with a uniform resource locator (URL) to share information within a messaging system independent of access capabilities (e.g., network, security, etc.) of a receiver computing device. Embodiments of the present invention convert a URL into a rich link and transmit the rich link to a receiving computing device. Additional embodiments of the present invention embed information into a rich link that can be displayed to a user of a receiver computing device independent of user access capabilities. Further embodiments of the present invention identify an access acknowledgement corresponding to a rich link transmitted to a receiver computing device.

Some embodiments of the present invention recognize challenges exist in determining whether a recipient of a link can gain access to information corresponding to the link. For example, a user that sends a link to a recipient cannot confirm that the recipient has access (e.g., permission) to the information corresponding to the link and/or that the recipient will have "network" access to utilize the link when attempting follow the link to the information. In this example, a device of the recipient or the network utilized to transmit the link can provide the user with acknowledgment that the link was received at a device of the user but cannot confirm whether the recipient has access to the information of the link. Embodiments of the present invention propose to solve this challenge by generating a rich link that provides the information regardless of whether the recipient has access.

Embodiments of the present invention can operate to prevent a user from performing a copy/paste function on an article of a webpage, which would likely be unformatted, into a messaging exchange. Additionally, embodiments of the present invention advance data sharing in a computing/messaging system by providing a more versatile link to share information. Furthermore, embodiments of the present invention reduce the amount of data a network processes related to transmitting and receiving information corresponding to retrieving information corresponding to a link.

Implementation of embodiments of the invention may take a variety of forms, and exemplary implementation details are discussed subsequently with reference to the Figures.

Figure 1:
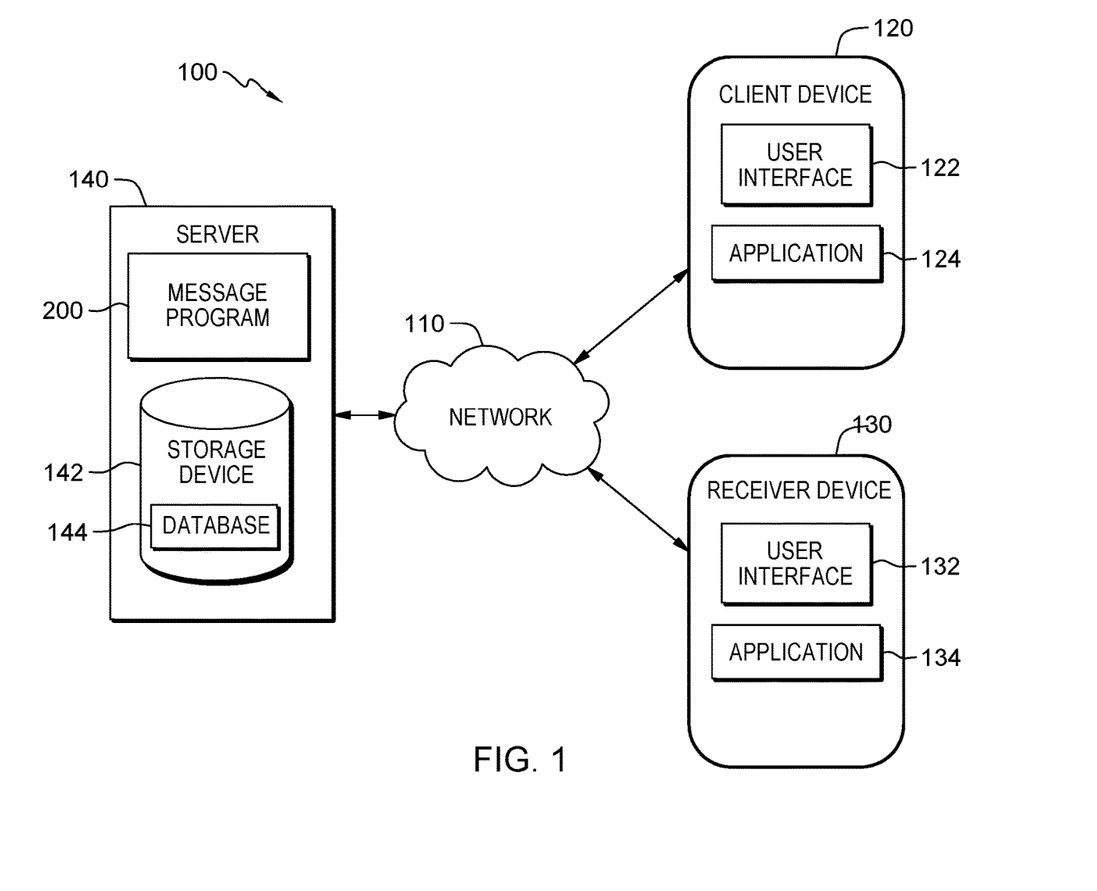
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Message program 200 enables the authorized and secure processing of personal data. Message program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Message program 200 provides information regarding personal data and the nature (e.g., type, scope, purpose, duration, etc.) of the processing. Message program 200 provides the user with copies of stored personal data. Message program 200 allows the correction or completion of incorrect or incomplete personal data. Delivery program 200 allows the immediate deletion of personal data.

Distributed data processing environment 100 includes server 140, receiver device 130, and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, receiver device 130, and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, messaging program, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of message program 200.

Receiver device 130 can be one or more of a laptop computer, a tablet computer, a smart phone, smart watch, a smart speaker, virtual assistant, or any programmable electronic device capable of communicating with various components and devices within distributed data processing environment 100, via network 110. In general, receiver device 130 represents one or more programmable electronic devices or combination of programmable electronic devices capable of executing machine readable program instructions and communicating with other computing devices (not shown) within distributed data processing environment 100 via a network, such as network 110. Receiver device 130 may include components as depicted and described in further detail with respect to FIG. 3, in accordance with embodiments of the present invention.

Receiver device 130 includes user interface 132 and application 134. In various embodiments of the present invention, a user interface is a program that provides an interface between a user of a device and a plurality of applications that reside on the client device. A user interface, such as user interface 132, refers to the information (such as graphic, text, and sound) that a program presents to a user, and the control sequences the user employs to control the program. A variety of types of user interfaces exist. In one embodiment, user interface 132 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 132 is a script or application programming interface (API).

Application 134 is a computer program designed to run on receiver device 130. An application frequently serves to provide a user with similar services accessed on personal computers (e.g., web browser, messaging program, playing music, e-mail program, or other media, etc.). In one embodiment, application 134 is mobile application software. For example, mobile application software, or an "app," is a computer program designed to run on smart phones, tablet computers and other mobile devices. In another embodiment, application 134 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 134 is a client-side application of message program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120, receiver device 130, and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and message program 200. Storage device 142 can be implemented with any type of storage device, for example, persistent storage 305, which is capable of storing data that may be accessed and utilized by client device 120, receiver device 130, and server 140, such as a database server, a hard disk drive, or a flash memory. In one embodiment storage device 142 can represent multiple storage devices within server 140. In various embodiments of the present invention, storage device 142 stores numerous types of data, which may include database 144. Database 144 may represent one or more organized collections of data stored and accessed from server 140. For example, database 144 includes a plurality of messages, contact information, textual data, URLs, etc. In one embodiment, data processing environment 100 can include additional servers (not shown) that host additional information that accessible via network 110.

Generally, message program 200 generates a rich link associated with a URL to share information within a messaging system independent of access capabilities of a receiver computing device. In one embodiment, message program 200 converts a URL of client device 120 to a rich link and transmits the rich link to receiver device 130. Additionally, message program 200 converts the rich link of receiver device 130 to a URL and identifies user interaction with the URL. Also, message program 200 determines whether receiver device 130 can access information corresponding to the URL. Furthermore, message program 200 can display textual data embedded in the rich link if receiver device 130 cannot access information corresponding to the URL.

Figure 2:
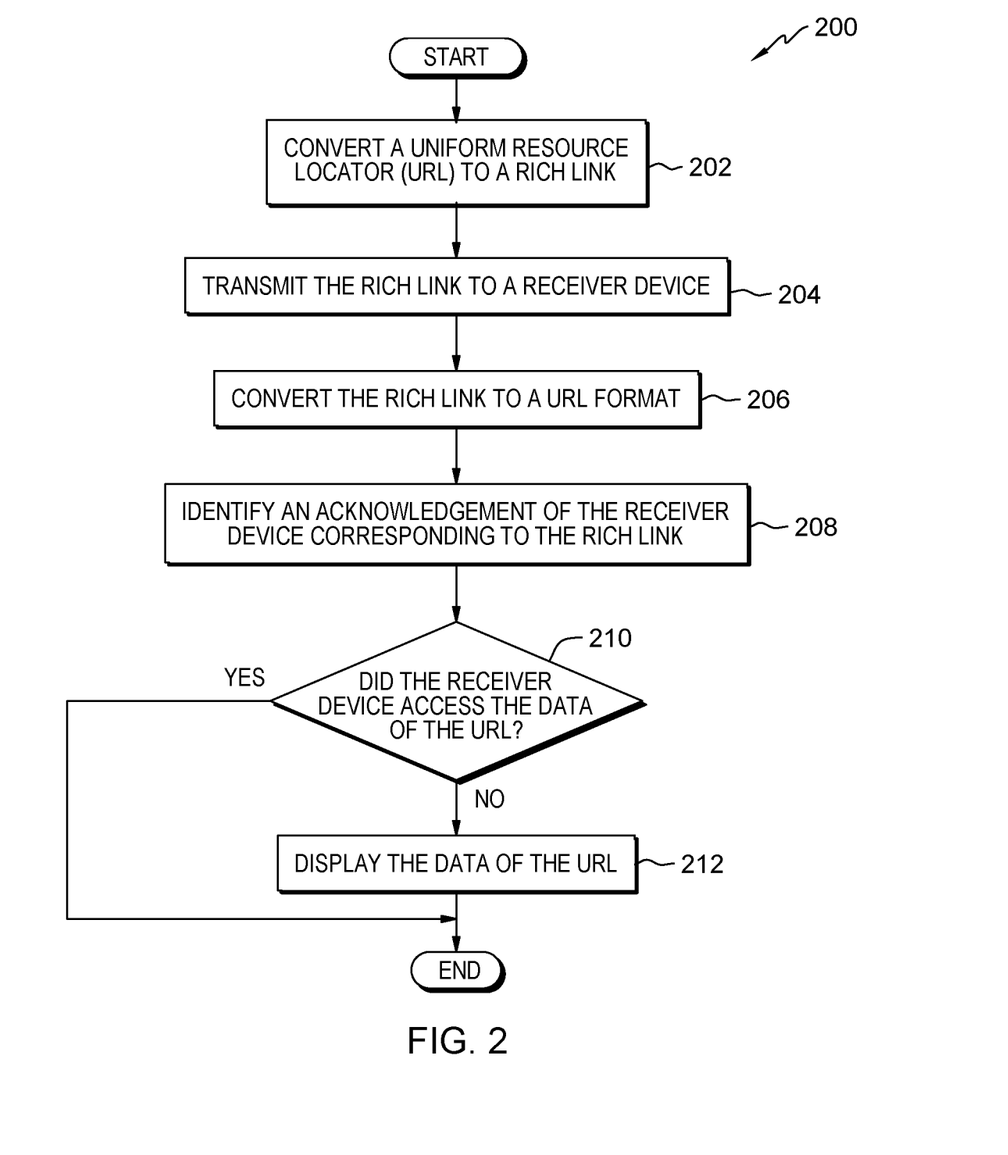
FIG. 2 is a flowchart depicting operational steps of a program, within the data processing environment of FIG. 1, for generation of a rich link associated with a uniform resource locator (URL) to share information within a messaging system independent of access capabilities of a receiver computing device, in accordance with embodiments of the present invention.

FIG. 2 is a flowchart depicting operational steps of message program 200, a program that generates a rich link associated with a URL to share information within a messaging system independent of access capabilities of a receiver computing device, in accordance with embodiments of the present invention. In one embodiment, message program 200 initiates in response to a user connecting client device 120 to message program 200 through network 110. For example, message program 200 initiates in response to a user registering (e.g., opting-in) a laptop (e.g., client device 120) with message program 200 via a WLAN (e.g., network 110). In another embodiment, message program 200 is a background application that continuously monitors client device 120. For example, message program 200 is a client-side application (e.g., application 124) that initiates upon booting of a laptop (e.g., client device 120) of a user and monitors data of the laptop.

In step 202, message program 200 converts a URL to a rich link. In one embodiment, message program 200 extracts textual data of application 124 of client device 120. For example, message program 200 collects textual data corresponding to a body of a URL (e.g., webpage) a user of a laptop (e.g., client device 120) is preparing to transmit to a computing device (e.g., receiver device 130) of a recipient. In this example, message program 200 utilizes natural language processing (NLP) techniques (e.g., syntactic analysis, text processing, relational and lexical semantics, etc.) to identify and extract a string of characters corresponding to the URL of a webpage the user is viewing in a browser (e.g., application 124). Also, message program 200 utilizes document artificial intelligence (AI) to identify and extract a plurality of paragraphs (e.g., textual data) corresponding to the body code segment of the webpage. Additionally, message program 200 can convert the string of characters corresponding to the URL into a hyperlink.

In another embodiment, message program 200 utilizes extracted textual data of application 124 to generate a rich URL. For example, message program 200 utilizes extracted textual data (e.g., URL, text of body) corresponding to the webpage of the browser (e.g., application 124) to populate a rich link (e.g., rich URL). In this example, message program 200 embeds a distinct string of characters in the rich link that signals a parser to parse the rich link as a long URL. Additionally, message program 200 utilizes the textual data extracted from the core of a document (e.g., the webpage) to embed as a value in the rich link.

In yet another embodiment, message program 200 monitors client device 120 for transmission of textual data to receiver device 130. For example, message program 200 intercepts a URL for a web resource from a laptop (e.g., client device 120) of a user directed to a computing device (e.g., receiver device 130) of a recipient. Additionally, message program 200 queries the computing device of the recipient for a network connectivity status.

In this example, if message program 200 determines that a query response of the computing device of the recipient indicates no network connectivity, then message program 200 can utilize NLP techniques of the aforementioned embodiments to extract textual data to populate a rich link (e.g., rich URL) corresponding to the intercepted URL.

In an example embodiment, a format of the rich link can be: "[HEADER=long_url][URL=url][CONTENT=the body of the webpage]". In this example embodiment, a value (e.g., long_url) of the "header" attribute can be used to signal (e.g., parse signal) messaging program 200 to parse the rich link as a long URL and may also be a distinct string of characters as well. Also, the rich link includes a "URL" attribute that can include an actual URL link or hyperlink to the webpage, which a recipient can utilize to access information of the webpage if the recipient has access. In addition, the rich link includes a "CONTENT" attribute that can include textual data (e.g., a plurality of paragraphs) corresponding to the webpage.

In step 204, message program 200 transmits the rich link to a receiver device. In various embodiments of the present invention users utilize a communication protocol via sender and receiver computing devices to transmit and receive messages. Additionally, messages can have different formats and functions in the messages content (image, sound, text etc.) within a messaging system and the embodiments of the present invention can utilize existing or new protocols so that the format of the messages can be processed by the messaging system.

In one embodiment, message program 200 transmits a generated rich URL of client device 120 to receiver device 130 via network 110. For example, message program 200 transmits a generated rich link from a laptop (e.g., client device 120) of a user to a receiving computing device (e.g., receiver device 130) of a recipient via a messaging application (e.g., application 124, client-side application) and a communication network (e.g., network 110). In this example, due to message program 200 automatically collecting and embedding the "body" (e.g., textual data) of a webpage, which is the valuable information a user wishes to provide to a recipient, in the rich link, the communication network no longer has to process data packets associated with retrieving the information of the webpage. In step 206, message program 200 converts the rich link to a URL format. In one embodiment, message program 200 utilizes natural language processing (NLP) techniques to identify one or more segments of a generated rich URL directed to receiver device 130. For example, message program 200 utilizes approximate string matching to determine whether a value corresponding to a "HEADER" attribute of a generated rich link includes a distinct string that signals message program 200 to parse (e.g., NLP technique) the generated rich link as a long URL. In this example, message program 200 utilizes NLP techniques (e.g., parsing, word segmentation, sentence breaking, etc.) to split the generated rich link into segments corresponding to the "URL" and "CONTENT" attributes. Additionally, message program 200 utilizes natural language understanding (NLU) and parsing to confirm that extracted textual data (e.g., value) corresponding to the "CONTENT" attribute is processed entirely (i.e., textual data of the body of the webpage is available to a recipient independent of access to the webpage).

In step 208, message program 200 identifies an acknowledgement of the receiver device corresponding to the rich link. In one embodiment, message program 200 identifies an acknowledgement of receiver device 130 corresponding to the generated rich URL of client device 120. For example, message program 200 utilizes a client-side application (e.g., application 124) of a laptop (e.g., client device 120) of a user to detect an acknowledgement character (e.g., acknowledgment code (ACK), unique signal, etc.) receiving computing device (e.g., receiver device 130) transmits via a messaging application (e.g., application 134) to the laptop of the user. In this example, messaging program 200 determines whether the acknowledgement character indicates that a generated rich link is received by the receiving computing device and/or the generated rich link is entirely processed as discussed in step 206. As a result, messaging program 200 provides a notification to the user that confirms accessibility to the textual data of the generated rich link by the recipient. In one scenario, if the receiving computing device receives the generated rich link but parsing of the generated rich link is not complete, then message program 200 (e.g., application 124, client-side application) generates a negative-acknowledgment (NACK) signal that indicates an error corresponding to an incompletion status of the parsing process to the laptop of the user.

In decision step 210, message program 200 determines whether the receiver device accesses the data of the URL. In one embodiment, message program 200 determines whether receiver device 130 accesses information corresponding to the generated rich URL of client device 120. For example, message program 200 monitors a receiving computing device (e.g., receiver device 130) to determine whether the receiving computing device can follow (e.g., access) a pointer embedded in a rich link to a document (e.g., webpage) or to a specific element (e.g., body of the webpage) within a document. In this example, message program 200 identifies a user interaction (e.g., click, tap, etc.) with the rich link and determines whether the receiving computing device is capable to follow the pointer (i.e., determine whether website has evolved or disappeared from pointer location). Additionally, message program 200 can identify errors (e.g., connectivity, permissions, etc.) returned in response to the receiving computing device attempting to follow the pointer. Also, message program 200 can query the receiving device utilizing a client-side application (e.g., application 124) to determine whether the receiving device currently has connectivity capabilities to follow the pointer.

In another embodiment, if message program 200 determines that receiver device 130 accesses information corresponding to the generated rich URL of client device 120 (decision step 212, "YES" branch), then message program 200 displays information on application 134 of receiver device 130. For example, message program 200 identifies a user interaction (e.g., click, tap, etc.) with a rich link of a laptop (e.g., client device 120) of a user and determines that a receiving computing device (e.g., receiving device 130) has accessed a webpage corresponding to a pointer of an embedded URL of the rich link. Accordingly, message program 200 can continue to monitor the receiving computing device for messages that include generated rich links (e.g., in case the recipient loses access due to connectivity or permission at a future time).

In another embodiment, if message program 200 determines that receiver device 130 cannot access information corresponding to the generated rich URL of client device 120 (decision step 212, "NO" branch), then message program 200 displays information on application 134 of receiver device 130. For example, message program 200 identifies a user interaction (e.g., click, tap, etc.) with a rich link of a laptop (e.g., client device 120) of a user and determines that a receiving computing device (e.g., receiving device 130) has no network connectivity and/or does not have permission to access a segment of a webpage corresponding to an embedded hyperlink. Accordingly, message program 200 opens a window on a display of the receiving computing device and displays the value corresponding to the "CONTENT" attribute of the rich link.

In step 212, message program 200 displays the data of the URL. In one embodiment, message program 200 initiates application 134 of receiver device 130 to display information of the generated rich URL. For example, message program 200 displays a plurality of paragraphs extracted from the body of a webpage of a rich link on a receiving computing device (e.g., receiver device 130) of a recipient. In this example, message program 200 extracts textual data (e.g., the plurality of paragraphs) from the rich link and initiates a pop-up window on a display screen of the receiving computing device to display the textual data to the recipient.

In another example, in response to message program 200 determining that a receiving computing device (e.g., receiver device 130) of a recipient receives a generated rich URL (e.g., receives an ACK message), message program 200 monitors the receiving device of the recipient to receive confirmation of success or failure accessing the URL embedded in the generated rich URL. In one scenario, if message program 200 receives confirmation that the receiving computing device failed to connect to the URL of the generated rich URL, then instructions are executed to provide the text of the web resource embedded in the generated rich URL to a display screen of the receiving computing device.

Figure 3:
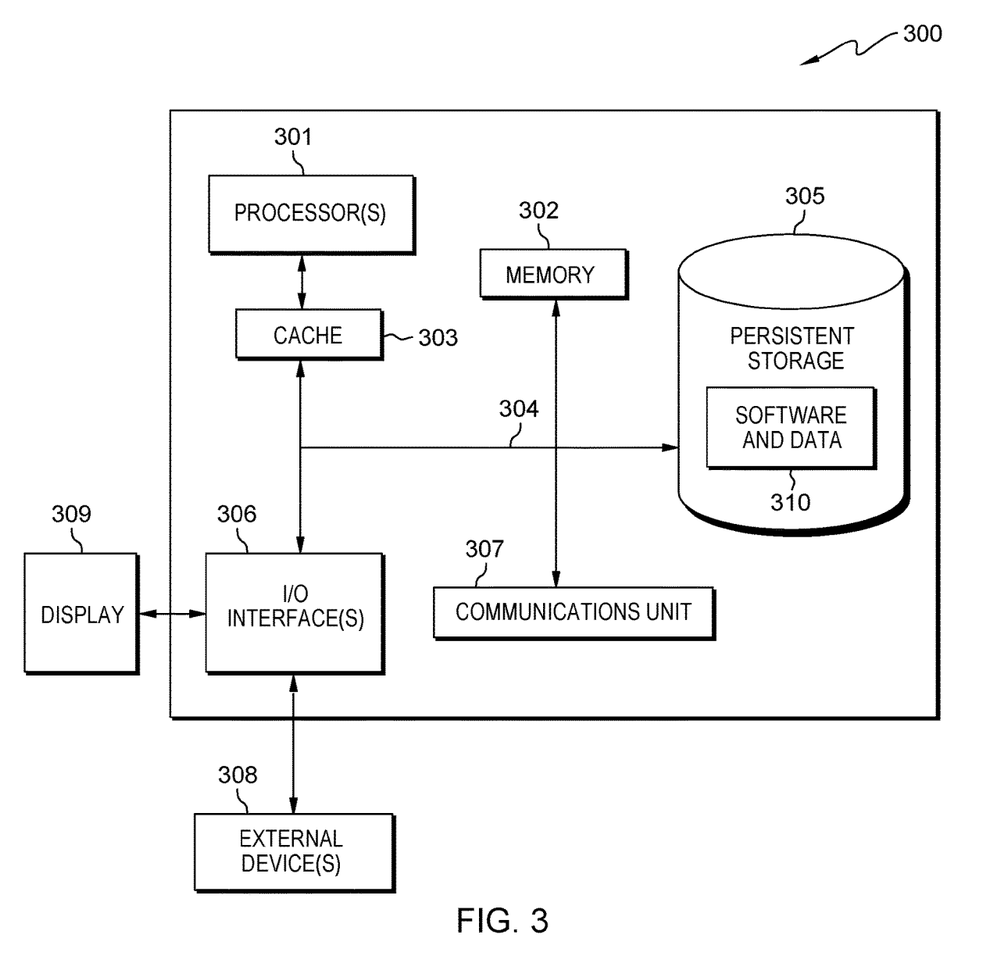
FIG. 3 is a block diagram of components of FIG. 1, in accordance with an embodiment of the present invention.

FIG. 3 depicts a block diagram of components of client device 120, receiver device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to receiver device 130, software and data 310 includes data of user interface 132 and application 134. With respect to server 140, software and data 310 includes data of storage device 142 and request program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising, in a messaging environment that includes a sending computing device and a receiving computing device:
   receiving a uniform resource locator (URL) from the sending computing device;
   extracting textual data of a web resource corresponding to the URL;
   converting the URL to a rich URL, the rich URL including a header that triggers parsing of contents of the rich URL, the contents including the textual data and a hyperlink that corresponds to the URL; and
   transmitting the rich URL to the receiving computing device with instructions to: (i) access the web resource using the hyperlink and display the web resource in a display of the receiving computing device, and (ii) in response to being unable to access the web resource using the hyperlink, access the textual data in the rich URL and display the textual data in the display of the receiving computing device.

2. The computer-implemented method of claim 1, further comprising:
   identifying a body segment of the web resource; and
   identifying one or more segments of the textual data of the web resource, wherein the one or more segments correspond to paragraphs of the body segment of the web resource.

3. The computer-implemented method of claim 1, further comprising:
   identifying an acknowledgement of the receiving computing device, wherein the acknowledgement indicates whether processing by the receiving computing device of the rich URL is complete.

4. The computer-implemented method of claim 3, further comprising:
   determining that processing by the receiving computing device of the rich URL is complete based at least in part on the acknowledgement; and
   transmitting an acknowledgment message to the sending computing device.

5. The computer-implemented method of claim 1, further comprising:
   transmitting a query to the receiving computing device for a connectivity status; and
   determining whether the receiving computing device is capable of accessing the web resource based at least in part on a response to the query.

6. The computer-implemented method of claim 5, further comprising:
   in response to determining that the receiving computing device is not capable of accessing the web resource, transmitting a negative acknowledgment to the sending computing device.

7. The computer-implemented method of claim 1, further comprising:
   transmitting a query to the receiving computing device for a permission status; and
   determining whether the receiving computing device is capable of accessing the web resource based at least in part on a response to the query.

8. A computer program product comprising:
   one or more computer readable storage media and program instructions stored on the one or more computer readable storage media, the program instructions comprising instructions to, in a messaging environment that includes a sending computing device and a receiving computing device:
   receive a uniform resource locator (URL) from the sending computing device;
   extract textual data of a web resource corresponding to the URL;
   convert the URL to a rich URL, the rich URL including a header that triggers parsing of contents of the rich URL, the contents including the textual data and a hyperlink that corresponds to the URL; and
   transmit the rich URL to the receiving computing device with instructions to: (i) access the web resource using the hyperlink and display the web resource in a display of the receiving computing device, and (ii) in response to being unable to access the web resource using the hyperlink, access the textual data in the rich URL and display the textual data in the display of the receiving computing device.

9. The computer program product of claim 8, further comprising program instructions, stored on the one or more computer readable storage media, to:
   identify a body segment of the web resource; and
   identify one or more segments of the textual data of the web resource, wherein the one or more segments correspond to paragraphs of the body segment of the web resource.

10. The computer program product of claim 8, further comprising program instructions, stored on the one or more computer readable storage media, to:
   identify an acknowledgement of the receiving computing device, wherein the acknowledgement indicates whether processing by the receiving computing device of the rich URL is complete.

11. The computer program product of claim 10, further comprising program instructions, stored on the one or more computer readable storage media, to:
   determine that processing by the receiving computing device of the textual data is complete based at least in part on the acknowledgement; and
   transmit an acknowledgment message to the sending computing device.

12. The computer program product of claim 8, further comprising program instructions, stored on the one or more computer readable storage media, to:
   transmit a query to the receiving computing device for a connectivity status; and
   determine whether the receiving computing device is capable of accessing the web resource based at least in part on a response to the query.

13. The computer program product of claim 12, further comprising program instructions, stored on the one or more computer readable storage media, to:
   in response to determining that the receiving computing device is not capable of accessing the web resource, transmit a negative acknowledgment to the sending computing device.

14. The computer program product of claim 8, further comprising program instructions, stored on the one or more computer readable storage media, to:
   transmit a query to the receiving computing device for a permission status; and
   determine whether the receiving computing device is capable of accessing the web resource based at least in part on a response to the query.

15. A computer system comprising:
   one or more computer processors;
   one or more computer readable storage media; and
   program instructions stored on the computer readable storage media for execution by at least one of the one or more processors, the program instructions comprising instructions to, in a messaging environment that includes a sending computing device and a receiving computing device:
   receive a uniform resource locator (URL) from the sending computing device;
   extract textual data of a web resource corresponding to the URL;
   convert the URL to a rich URL, the rich URL including a header that triggers parsing of contents of the rich URL, the contents including the textual data and a hyperlink that corresponds to the URL; and
   transmit the rich URL to the receiving computing device with instructions to: (i) access the web resource using the hyperlink and display the web resource in a display of the receiving computing device, and (ii) in response to being unable to access the web resource using the hyperlink, access the textual data in the rich URL and display the textual data in the display of the receiving computing device.

16. The computer system of claim 15, further comprising program instructions, stored on the one or more computer readable storage media for execution by at least one of the one or more processors, to:
   identify a body segment of the web resource; and
   identify one or more segments of the textual data of the web resource, wherein the one or more segments correspond to paragraphs of the body segment of the web resource.

17. The computer system of claim 15, further comprising program instructions, stored on the one or more computer readable storage media for execution by at least one of the one or more processors, to:
   identify an acknowledgement of the receiving computing device, wherein the acknowledgement indicates whether processing by the receiving computing device of the rich URL is complete.

18. The computer system of claim 17, further comprising program instructions, stored on the one or more computer readable storage media for execution by at least one of the one or more processors, to:
   determine that processing by the receiving computing device of the textual data is complete based at least in part on the acknowledgement; and
   transmit an acknowledgment message to the sending computing device.

19. The computer system of claim 15, further comprising program instructions, stored on the one or more computer readable storage media for execution by at least one of the one or more processors, to:
   transmit a query to the receiving computing device for a connectivity status; and
   determine whether the receiving computing device is capable of accessing the web resource based at least in part on a response to the query.

* * * * *